United States Patent [19]

Henry et al.

[11] 4,201,853

[45] May 6, 1980

[54] POLYMERIC BINDERS OF NITRATED PHENOLS AND POLYISOCYANATES WHICH REVERSIBLY DISSOCIATE AT ELEVATED TEMPERATURES

[75] Inventors: Ronald A. Henry, China Lake; Eugene C. Martin, Ridgecrest, both of Calif.

[73] Assignee: The United States of America as represented by the Secretary of the Navy, Washington, D.C.

[21] Appl. No.: 907,067

[22] Filed: May 18, 1978

[51] Int. Cl.$^2$ .................. C08G 18/06; C08G 18/28
[52] U.S. Cl. .................................. 528/85; 149/105;
528/75; 528/80; 528/83; 528/125; 528/210; 528/211
[58] Field of Search ............... 528/75, 80, 83, 85, 528/210, 211, 125; 149/105

[56] References Cited

U.S. PATENT DOCUMENTS

| | | | |
|---|---|---|---|
| 3,020,261 | 2/1962 | Brown | 528/85 |
| 3,079,355 | 2/1963 | Herring | 528/85 |
| 3,245,849 | 4/1966 | Klager et al. | 528/85 |
| 3,245,962 | 4/1966 | Fischer | 528/85 |
| 3,288,863 | 11/1966 | Hall et al. | 528/85 |
| 3,681,290 | 8/1972 | Meckel et al. | 528/85 |
| 3,778,320 | 12/1973 | Yosin et al. | 149/109 |
| 3,909,497 | 9/1975 | Henry et al. | 528/85 X |
| 3,968,723 | 7/1976 | Falterman et al. | 86/1 A |

*Primary Examiner*—Lester L. Lee
*Attorney, Agent, or Firm*—R. S. Sciascia; W. Thom Skeer; L. E. K. Pohl

[57] ABSTRACT

Polymeric binders for plastic bonded explosives. The binders are prepared from polyfunctional ortho-nitrophenols and polyisocyanates. The binders will reversibly dissociate when subjected to temperatures the range of from 100° to 150° C.

6 Claims, No Drawings

POLYMERIC BINDERS OF NITRATED PHENOLS AND POLYISOCYANATES WHICH REVERSIBLY DISSOCIATE AT ELEVATED TEMPERATURES

BACKGROUND OF THE INVENTION

1. Field of the Invention

This invention relates to polymeric materials which will reversibly dissociate into the starting materials from which they were prepared or into liquid oligomers at temperatures in the range of from 100° to 150° C.

2. Description of the Prior Art

In the past, plastic bonded explosives have typically utilized crosslinked thermosetting polymers as binders. These binder materials have both desirable and undesirable characteristics.

One desirable characteristic is the fact that their use permits one to make choices which permit the control of physical properties of the explosive. Another is that explosives utilizing them tend to be highly shock resistant. Still another is that explosives utilizing them tend to have high impact strength. Further, explosives utilizing them are useable above the usual upper service temperature limit of melt-cast explosives. Still further, explosives utilizing them can even be used as structural components.

Among the disadvantages of using such binders is the fact that the binder has a limited pot-life during which it has manageable viscosity and pour characteristics. Another disadvantage is that compositions containing them cannot be recycled once the binders have cured completely or even partially if the binder viscosity does not permit void free casting. Also, explosives utilizing them are extremely difficult to remove from outmoded ordnance or the like.

With the foregoing disadvantages in mind, it was sought to develop polymeric binders which would reversibly dissociate into the starting materials from which they were prepared or into liquid low molecular weight oligomers upon exposure to elevated temperatures. Reversibly dissociable binders offered the potential advantages of (1) extended (ideally infinite) pot-lives during mixing and formulation; (2) reduced waste since scrap or recovered explosive could be recycled back to the mixing kettle; (3) desensitized explosive compositions because heat would be removed from "hot spots" by endothermic dissociation; (4) possible use of dense, energetic co-monomers as curing agents; and (5) easy removal of explosive compositions containing them from outmoded ordnance and the like.

SUMMARY OF THE INVENTION

According to this invention, reversibly dissociable polymeric materials are prepared by reacting polyfunctional ortho-nitrophenols with polyisocyanates. The polymeric materials of this invention dissociate into the starting materials upon being heated to a temperature in the range of from 100° to 150° C.

DESCRIPTION OF THE PREFERRED EMBODIMENTS

Essentially, this invention comprises preparing a polymeric binder for a plastic bonded explosive (hereinafter sometimes referred to as a PBX) that will dissociate into the monomers from which it was made or to liquid oligomers if it is heated to a temperature in the range of from about 100° to 150° C. The reversibly dissociable polymeric binders are prepared by mixing certain hereinafter specified polyfunctional ortho-nitrophenols with certain hereinafter specified polyisocyanates, adding a catalyst that promotes the formation of a polyurethane and allowing a polyurethane to form.

Some of the hereinafter specified polyfunctional ortho-nitrophenols are soluble in some of the hereinafter specified polyisocyanates. When that is the case, a PBX can be formed by dissolving the polyfunctional ortho-nitrophenol in the polyisocyanate, adding explosive powder (such as HMX or RDX) and catalyst and allowing the polymerization reaction to take place either at ambient or at an elevated temperature. Cast explosives can be formed in this manner.

Some of the hereinafter specified polyfunctional ortho-nitrophenols are not soluble in the hereinafter specified polyisocyanates. When that is the case, somewhat more sophisticated techniques are required to form plastic bonded explosives.

One technique that can be used is a "shock gel" technique. The polyfunctional ortho-nitrophenol and the polyisocyanate are dissolved in a small amount of mutual solvent and a catalyst is added to cause the two to react and form a polyurethan which, like its procursers, remains in solution. Explosive powder is than added to the solution and a non-solvent is added to "shock" the polymer out of solution. This causes the polymer to precipitate onto the explosive and a polymer coated powder is recovered. This powder may be formed into desired explosive shapes by pressing or extrusion.

A technique similar to the "shock gel" technique may be practiced by dissolving the reactants in a mutual solvent, adding explosive filler ingredients and a catalyst and then removing the solvent by means of a vacuum or the like.

Another technique that can be used involves dissolving the polyfunctional ortho-nitrophenol and the polyisocyanate in a material that is a mutual solvent for the two and which will also act as a plasticizer for the resulting polyurethan. A catalyst and explosive powder are then added whereby the catalyst causes the polyurethan to form and a plasticized PBX results.

THE POLYFUNCTIONAL ORTHO-NITROPHENOLS

The preparations of the polyfunctional ortho-nitrophenols which may be reacted with polyisocyanates to yield reversibly dissociable binders are summarized in the following series of examples.

EXAMPLE 1

2,2-Bis(4-hydroxyphenyl)alkanes (from which nitrated derivatives are formed).

Several 2,2-bis(4-hydroxphenyl)alkanes were prepared. The preparation of 2,2-bis(4-hydroxyphenyl)octane is typical.

A 1-liter two-necked, round-bottomed flask fitted with a fritted glass gas delivery tube and a magnetic stirring bar was charged with 141.2 g (1.5 mole) of phenol and 64.1 g (0.5 mole) of 2-octanone. The resulting solution was stirred at room temperature while a slow stream of hydrogen chloride was bubbled in over a period of 6½ hr; 7.7 g was absorbed. After standing overnight the mixture absorbed an additional 1.0 g over about 7½ hr.

Crystallization of the mixture occurred between 48 and 72 hr reaction time and the reaction was complete after 168 hr (nmr). One hundred ml of hot water was added and the mixture was subjected to steam distillation until a FeCl₃ test for phenol was negative; about 2.2 liters of distillate was collected.

The water layer was decanted, the viscous, brown residue dissolved in 700 ml of warm (70° C.) 1,2-dichloroethane, and the solution gravity filtered through a warm (60° C.) jacketed funnel. Crystallization of the product was allowed to proceed at 5° C. Yield: 123.5 g (82.8%) of light tan solid; m.p. 88°–91° C. (uncorr.).

Melting points for several bis-phenols are listed in Table 1. To prepare the other derivatives shown in Table 1, one merely substitutes the proper ketone for the 2-octanone used above.

The above procedure is taught by Reid and Wilson in *J. Am. Chem. Soc.*, Vol. 66, pp. 967–69 (1944).

EXAMPLE 2

Nitrated 2,2-bis(4-hydroxyphenyl)alkanes.

As in the case of the non-nitrated monomers of Example 1, several nitrated derivatives were prepared. The preparation of 2,2-bis(3-nitro-4-hydroxyphenyl)octane is typical.

With vigorous stirring and cooling to keep the temperature in the range 25°–30° C., 340 ml of 3N nitric acid was added dropwise during 40 minutes to a solution/slurry of 74.6 g (0.25 mole) of 2,2-bis(hydroxyphenyl)octane in 300 ml of benzene. After the first 50 ml of nitric acid had been introduced, 0.4 g of sodium nitrite was added; a mild exotherm ensued and the reaction mixture became dark orange-red. All of the starting bis-phenol had dissolved by the time the acid addition was completed; the color of the solution gradually lightened. The mixture was stirred for 2 hr more at 25°–27° C. The benzene layer was then separated, washed thoroughly with three 200 ml portions of water, and evaporated under reduced pressure until the viscous, liquid product was free of volatiles. The yield was 94.3 g (97.5% of theory for a dinitro derivative). A thin layer chromatogram indicated that this crude material was 85–90% dinitro derivative, with the balance of about equal parts of the mono and trinitro derivatives. An 88% recovery of dinitro compound, based on the weight of crude product, could be effected by chromatographing the latter on silica gel using benzene as the eluent.

Anal. Calcd. for $C_{20}H_{24}N_2O_6$: N, 7.21. Found: N, 7.17, 7.13, 7.08.

Although the chromatographed product was obtained as a very viscous liquid, which would remain in this state for weeks if not seeded, the compound could be induced to crystallize by dissolving 2.5 g in 15 ml of absolute ethanol and chilling at 5° C. for several days; m.p. 54°–56° C.

Properties of other dinitro-bis-phenols are summarized in Table 1. The yields of the crude dinitro compounds obtained from the C-4, C-6, C-7 and C-9 alkanes were comparable to that for the C-8, namely 97–100% of theory. The recovery on chromatography also was in the range 86 to 89%.

Table 1 lists the 2,2-bis(4-hydroxyphenyl)alkanes and nitrated derivatives prepared according to Examples 1 and 2 and their melting points.

TABLE 1.

Bis-phenols and Dinitro-bis-phenols.

$$HO-C_6H_3(X)-C(CH_3)(R')-C_6H_3(X)-OH$$

| R' | X = H m.p., °C. | X = NO₂ m.p., °C. | Analysis % nitrogen Theory | Recryst. | Found Chromatographed[a] | Crude[b] |
|---|---|---|---|---|---|---|
| CH₃ | 153–156 | 132–135[c] | 8.81 | 8.44, 8.53 | — | — |
| C₂H₅ | 125–128 | 77–80[d] | 8.43 | 8.69 | — | 8.35 |
| n-C₄H₉ | 123.5–124.5[e] | 78–79 | 7.77 | 7.64 | 7.68 | — |
| n-C₅H₁₁ | 66.5–70 | 76–78 | 7.48 | 7.41 | 7.48 | — |
| n-C₆H₁₃ | 88–91 | 54–56 | 7.21 | — | 7.17 | 7.19[f] |
| n-C₇H₁₅ | 42–46.5 | 57–60 | 6.96 | 6.99 | 6.83 | 6.84 |

[a] Material recovered by chromatography on silica gel.
[b] Material recovered from nitration reaction and before chromatography.
[c] ¹H nmr (CDCl₃, 60 MHz), δ 1.68 (s, 6H, CH₃), 7.08 (d, 2H, H₅, H₅', $J_{H5H6}$ = 8.5 Hz), 7.36 (dd, 2H, H₆, H₆', $J_{H5H6}$ = 8.5 Hz, $J_{H2H6}$ = ~2 Hz), 8.07 (d, H₂, H₄', $J_{H2H6}$ = ~2 Hz).
[d] ¹H nmr (CDCl₃, 60 MHz), δ 0.78 (t, 3H, CH₂CH₃), 1.67 (s, 3H, —CCH₃), 2.18 (q, 2H, —CH₂CH), 7.15 (d, 2H, H₅, H₅, $J_{H5H6}$ = 8.5 Hz), 7.43 (dd, 2H, H₆, H₆', $J_{H5H6}$ = 8.5 Hz, $J_{H2H6}$ = ~2Hz), 8.13 (d, 2H, H₂, H₂', $J_{H2H6}$ = ~2 Hz), 10.7 (s, 2H, OH).
[e] Anal. Calcd. for $C_{18}H_{22}O_2$: C, 79.96; H, 8.20. Found: C, 79.31; H, 8.06.
[f] Crude product in benzene was stirred with decolorizing carbon for 16 hr, filtered and evaporated.

EXAMPLE 3

Nitration of bis-phenol-A.

Nitration of bis-phenol-A (2,2-bis(4-hydroxyphenyl)propane) in benzene with 8N nitric acid at 20°–25° C. for 17 hours yielded mainly tri- and tetranitro compounds. For example, one fraction poorly soluble in both benzene and ethanol melted 220°–230° C. and had 12.82% N (theory for trinitro is 11.57% and for tetranitro is 13.73%). ¹H nmr (CDCL₃ plus DMSO-d₆, 60 MHz), 1.80 (s, 6H, CH₃), 8.17 (s, 4H, H₂, H₆, H₂', H₆'). Another fraction, soluble in benzene but recrystallizable from benzene-cyclohexane, melted 135°–140° C. and contained 11.58% N by analysis. ¹H nmr (CDCl₃, 60 MHz), δ1.77 (s, 6H, CH₃), 7.10 (d, 1H, H₅, $J_{H5H6}$=8.5 Hz), 7.40 (dd, 1H, H₆, $J_{H5H6}$=8.5 Hz, $J_{H2H6}$=~2H2), 8.10 (d, 1H, H₂, $J_{H2H6}$=~2Hz), 8.20 (s, 2H, H₂', H₆').

When the nitrating time was reduced to 1.5 hr at 22°–25° C., the isolated crude product had a m.p. 110°–120° C. The ¹H nmr spectrum indicated mainly the dinitroderivative with some trinitro. The nitrogen analysis was consistent (Found: 9.43%; theory for dinitro, 8.81%).

EXAMPLE 4

2-(2-Hydroxy-3,5-dinitrophenoxy)ethanol.

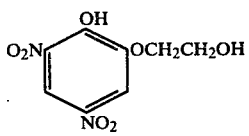

This compound was made in 64% yield (crude) when 30.8 g (0.2 mole) of 2-(2-hydroxyphenoxy)ethanol in 150 ml of benzene was nitrated at 25°–42° C. with 95 ml of 6N nitric acid using 0.1 g of sodium nitrite as catalyst. About 1.25 hr were required for the addition of the acid to the vigorously stirred and cooled benzene solution. The product, which was a mixture of dark tar and orange solid, was recovered, washed well with water and dried. It was next extracted with eight 100 ml portions of boiling benzene; the combined extracts were evaporated to dryness and the residue recrystallized twice from 4:1 water-2-propanol and once from 2:1 water-2-propanol with charcoal decolorization; m.p. 152.5°–155.5° C. after vacuum drying. $^1$H nmr (CDCl$_3$ plus DMSO-d$_6$, 60 MHz), $\delta$ 3.96 (t, 2H, —CH$_2$—OH), 4.26 (t, 2H, aryl-O-CH$_2$), 7.95 (d, 1H, H$_6$, J$_{H4H6}$=~2.5 Hz), 8.53 (d, 1H, H$_4$, J$_{H4H6}$=~2.5 Hz).

Anal. Calcd. for C$_8$H$_8$N$_2$O$_7$: C, 39.35; H, 3.30; N, 11.47. Found: C, 39.37; H, 3.33; N, 11.43.

An attempt to nitrate 2-(2-hydroxyphenoxy)ethanol with 3N nitric acid and sodium nitrite catalyst at 25°–30° C. was unsuccessful.

EXAMPLE 5

2-(3-Hydroxy-4,6-dinitrophenoxy)ethanol.

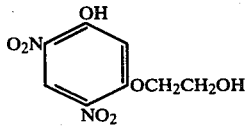

This compound, m.p. 88°–89° C. after recrystallization from benzene, was recovered in low yield from the nitration of 2-(3-hydroxyphenoxy)ethanol in benzene with 3N nitric acid and sodium nitrite catalyst at 25°–30° C. Much resinous material, melting above 320° C., was formed. $^1$H nmr (DMSO-d$_6$ plus CDCl$_3$, 60 MHz), $\delta$ 4.04 (t, 2H, —CH$_2$OH), 4.31 (t, 2H, O—CH$_2$-H$_2$OH), 6.92 (s, 1H, H$_2$), 8.87 (s, 1H, H$_5$), 11.0–11.5 (broad s, 1H, phenolic-OH); the alcohol OH was buried under the AA'BB' pattern of the ethylene group.

Anal. Calcd. for C$_8$H$_8$N$_2$O$_7$: C, 39.35; H, 3.30; N, 11.48. Found: C, 39.73; H, 3.41; N. 11.24.

Based on an $^1$H nmr analysis of a semi-solid residue obtained after isolation and recrystallization of the above dinitro compound, some mono-nitro compound was also formed (present in the spectrum was a doublet, J=10 Hz, and a doublet of doublets, J=10 HZ and J=1 Hz). No effort was made to recover and purify this mono-nitro compound and to ascertain whether it was the 4- or 6-isomer.

EXAMPLE 6

The dinitro derivative of diethylstilbesterol.

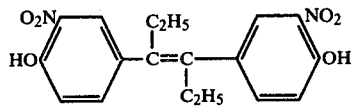

Diethylstilbesterol (16.8 g, 0.0625 mole) slurried in 150 ml of benzene was nitrated in the usual manner at 25°–30° C. with 85 ml of 3N nitric acid and 0.2 g of sodium nitrite; yield, 24.0 g of orange gum. Extraction with one 50 ml and three 25 ml portions of hot ethanol left 9.7 g of solid, m.p. 175°–185° C., whose $^1$H nmr indicated that it was largely the desired dinitro compound. $^1$H nmr (DMSO-d$_6$, 60 MHz), $\delta$ 0.72 (t, 3H, —CH$_2$CH$_3$), 2.15 (q, 2H, —CH$_2$CH$_3$), 7.20 (d, 1H, H$_5$, J$_{H5H6}$=8.5 Hz), 7.45 (dd, 1H, H$_6$J$_{H5H6}$=8.5 Hz, J$_{H2H6}$=~1Hz), 7.74 (d, 1H, H$_2$, J$_{H2H6}$=~1 Hz).

EXAMPLE 7

2,2'-Dihydroxy-4,4'-dimethoxy-3,5'-dinitrobenzophenone.

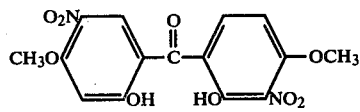

This compound was isolated in about 5% yield from the mixture of products formed during the nitration of 2,2'-dihydroxy-4,4'-dimethoxybenzophenone in benzene at 25°–30° C. with 4 N nitric acid; m.p. 219.5°–220.5° C. after recrystallization from benzene and vacuum drying at 70° C., 25 mm to remove the half mole of solvate. $^1$H nmr (CDCl$_3$ plus DMSO-d$_6$, 60 MHz), $\delta$ 4.02 (s, 6H, OCH$_3$), 6.81 (s, 1H, H$_{3'}$), 6.86 (d, 1H, H$_5$, J$_{H5H6}$=9 Hz), 7.79 (d, 1H, H$_6$), 8.10 (s, 1H, H$_{6'}$).

Anal. Calcd. for C$_{15}$H$_{12}$N$_2$O$_9$: C, 49.46; H, 3.32, N, 7.69. Found: C, 49.48; H, 3.24; N, 7.53.

EXAMPLE 8

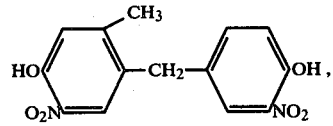

Isomers and higher nitration products.

Meta cresol was condensed with formaldehyde following the procedure of Hardin and Reid in "The Condensation of Certain Phenols with Some Aliphatic Aldehydes," J. Am. Chem. Soc., Vol. 54 (1932), pp. 4325–4330. The crude product so obtained was nitrated in the usual manner in benzene at 20°–25° C. using 6 N nitric acid; the nitration product was a viscous liquid. Small quantities of solid products, some melting up to 230° C., were recovered by digestion of the crude nitration product with hot 95% ethanol followed by cooling; but the bulk of the product, because of the complexity of the mixture, remained as a liquid. Both the $^1$H nmr spectra and nitrogen analyses (10.2–10.9%) on the various fractions indicated mixtures of di- and tri-nitro bodies. The purified liquid mixture (tar removed by charcoaling) did not furnish a homogeneous) system with DDI even upon warming; a mutual solvent, such as tetrahydrofuran, was required.

EXAMPLE 9

Preparation and nitration of esters of 4-hydroxybenzoic acid.

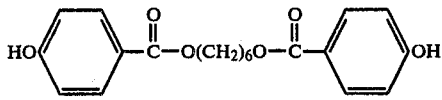

This diester was made by refluxing 4-hydroxybenzoic acid (11.0 g, 0.080 mole) and 1,6-hexandiol (4.5 g, 0.038 mole) in dry benzene with 0.4 g of 4-toluenesulfonic acid monohydrate until the theoretical amount of water was evolved; m.p. 170°–181° C. after recrystallization from absolute ethanol. $^1$H nmr (CDCl$_3$ plus DMSO-d$_6$), δ 1.57 (broad s, 8H, 4C$\underline{H}_2$), 4.30 (t, 4H, OC$\underline{H}_2$—), 6.90 (d, 4H, H$_3$, H$_{3'}$, H$_5$, H$_{5'}$, J=9 Hz), 7.97 (d, 4H, H$_2$, H$_{2'}$, H$_6$, H$_{6'}$, J=9Hz).

Anal. Calcd. for C$_{20}$H$_{22}$O$_6$: C, 67.02; H, 6.19. Found: C, 67.08; H, 6.50.

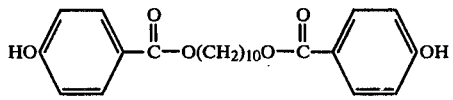

This compound was prepared as above except 1,10-decanediol was used. After two recrystallizations from absolute ethanol, the di-ester melted 158°–161° C. $^1$H nmr (CDCl$_3$ plus DMSO-d$_6$, 60 MHz), δ 4.28 (t, 4H, –OC$\underline{H}_2$CH$_2$–), 6.92 (d, 4H, H$_3$, H$_{3'}$, H$_5$, H$_{5'}$, J=10 Hz), 7.93 (d, 4H, H$_2$, H$_{2'}$, H$_6$, H$_{6'}$, J=9 Hz), 9.88 (s, 2H, $\underline{H}$O—).

Anal. Calcd. for C$_{24}$H$_{30}$O$_6$: C, 69.54; H, 7.30. Found: C, 69.54; H, 7.43.

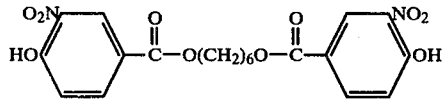

1,6-Hexandeiol di-(4-hydroxy benzoate) (4.3 g, 0.012 mole) in 15 ml of 96% sulfuric acid was nitrated at 15°–25° C. with 2.5 g. (0.025 mole) of 70% nitric acid during 45 min; quenched on ice, filtered, washed with water and dried, yield of crude product, 5.1 g, m.p. 140°–165° C. Extraction of the crude product with two 150 ml and one 100 ml portions of boiling 95% ethanol left impure dinitro compound, m.p. 180°–181° C.

Anal. Calcd. for C$_{20}$H$_{22}$N$_2$O$_{10}$: N, 6.25. Found: N, 6.52.

Cooling the alcoholic extracts furnished a pale yellow granular solid, m.p. 140°–155° C.

Anal. Calcd. for C$_{20}$H$_{21}$N$_3$O$_{12}$: N, 8.52. Found: N, 8.50.

The starting unnitrated diester was recovered after an attempt to accomplish this nitration with 3 N nitric acid and nitrite ion catalysis using the same procedure routinely used with the bis-phenol.

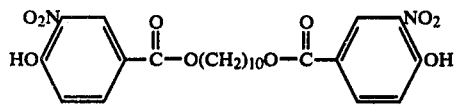

This dinitro-diester was made by the same procedure as in the previous example. The residue left after extracting the crude product with hot ethanol melted 132°–134° C., or 135°–137° C. after allowing the melt to cool and resolidify, then remelting. This ester was readily soluble in tetrahydrofuran, poorly soluble in dimer diisocyanate (DDI), somewhat soluble in hot isodecyl pelargonate but crystallized upon cooling, and poorly soluble in bis-dinitropropyl formal/acetal. The $^1$H nmr spectrum was consistent with the assigned structure.

Anal. Calcd. for C$_{24}$H$_{28}$N$_2$O$_{10}$: N, 5.55. Found: N, 5.66.

THE POLYISOCYANATES

Examples of polyisocyanates that may be used in the practice of this invention are dimer diisocyanate (a diisocyanate having a 36 carbon chain obtainable from General Mills), Desmodur N-100 (a triisocyanate from Mobay useful for crosslinking), 1,6-hexamethylene diisocyanate and lysine methylester diisocyanate. Dimer diisocyanate is preferred and represents the best mode of practicing the invention. The named polyisocyanates are representative but not exhaustive of those that may be used.

THE CATALYSTS

Dibutyltin dilaurate (Thermolite #12) is the preferred catalyst and represents the best mode of practicing the invention. Other catalysts which may be used are pyridine, ferric acetylacetonate and triphenylbismuth. As in the case of the polyisocyanates, this list is representative and not meant to be exhaustive.

THE SOLVENTS

If a polyfunctional ortho-nitrophenol is not soluble in a polyisocyanate and it is desired to practice the invention using the "shock gel" technique described above, tetrahydrofuran is a suitable solvent. On the other hand, if it is desired to practice the invention using the technique which produces a plasticized PBX, bis-dinitropropyl formal/acetal, tetrahydrofuran, mixtures of the two and isodecyl perlargonate may all be used as the solvent/plasticizer. This list is representative but not exhaustive of suitable solvent/plasticizers. Of course, if the chosen polyfunctional ortho-nitrophenol is soluble in the chosen polyisocyanate neither a solvent nor a solvent/plasticizer is required. This latter represents the best mode of practicing the invention because it requires less steps than the other two techniques. However, the majority of the polyfunctional ortho-nitrophenols are not soluble in the polyisocyanates and it is usually the case that the "shock gel" technique or the technique leading to a plasticized PBX must be used.

Of the polyfunctional ortho-nitrophenols whose preparation is discussed above, those having the formula:

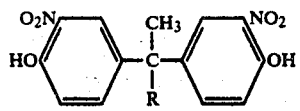

wherein R is selected from the group consisting of $C_6H_{13}$ and $C_7H_{15}$ are soluble in dimer diisocyanate and, therefore, may be used in conjunction with dimer diisocyanate to practice the invention without the use of a solvent or a solvent/plasticizer.

THE POLYMERS

The following series of examples specifically set forth conditions used in preparing polymers from some of the above-described monomers. More specifically, example 10 sets forth conditions used where a plasticizer/solvent was employed, example 11 sets forth conditions where a removable solvent was employed, example 12 sets forth conditions where no solvent used and example 13 sets forth conditions where a prepolymer was formed and then a cross-linker, Desmodur N-100, was employed. Desmodur N-100 has the formula:

$$OCN(CH_2)_6N-\overset{O}{\underset{|}{C}}-N(CH_2)_6NCO$$
$$\underset{|}{C=O}$$
$$\underset{|}{N-H}$$
$$(CH_2)_6NCO.$$

In practicing this invention with starting materials other than those specifically set forth in the following examples, one uses the same conditions and merely changes the starting materials.

EXAMPLE 10

A mole ratio of two moles of

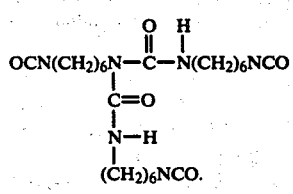

per one mole of dimer diisocyanate were dissolved in the plasticizer/solvent isodecyl perlargonate (27.6% by weight) and a catalytic amount (0.2%) of dibutyltin dilaurate (Thermolite #12) was added. A fluid, homogeneous mix was easily obtained. The mix was heated at 55° C. for 24 hours after which time it had a viscosity of 32.6 Pascal-seconds (Pa.s) at 25.1° C. Another equivalent of dimer diisocyanate was then added and mixed until homogeneous. The viscosity of this latter mix was 8.7 Pa.s at 24.0° C. This latter mix cured slowly at ambient temperature to a soft, tacky, plasticized resin.

EXAMPLE 11

A mole ratio of one mole of the compound:

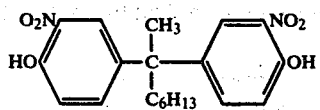

per mole of dimer diisocyanate was dissolved in tetrahydrofuran (1 part per part of reactants) and about 1% Thermolite was added. After 25 hours at ambient temperature, the solvent was removed at pump limit on a rotary evaporator. Sufficient reaction had occurred so that the dinitro-bis-phenol-A no longer crystallized or precipitated from the viscous liquid. Curing was then continued at ambient temperature and was essentially complete in four more days.

EXAMPLE 12

Equimolar amounts of

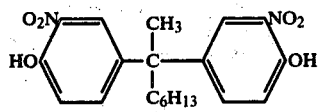

and dimer diisocyanate were dissolved in each other and a small amount of Thermolite #12 (0.2%) was added. A cure temperature of 55°-57° C. was used. After 20 hours at cure temperature the resin was so viscous it would barely flow. By way of comparison, a portion of the same catalyzed mixture kept at 25° C. still flowed after 6 days but not after 11 days. An uncatalyzed mix was very fluid after 4 weeks.

EXAMPLE 13

A mixture of

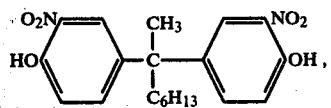

dimer diisocyanate and Desmodur N-100 (equivalent ratio 0.0296:0.0266:0.00296) was formed. The reactants were mixed overnight at ambient temperature and then for one hour at 55° C. The catalyst, Thermolite #12 (0.33%) was then added and thoroughly dispersed. After 24 hours at a cure temperature of 55°-56° C., the resin would barely flow. After 48 hours it was a tough but heterogeneous solid. The Desmodur N-100 acted as a cross-linker, linking linear polyurethan chains together.

The foregoing four examples are specific examples of specific polymers prepared. To form a plastic bonded explosive utilizing the polymers one would, of course, add explosive fillers. All of the foregoing polymers plus those that can be prepared using other combinations of the starting materials set forth above either dissociate into the starting materials or into liquid oligomers when heated to a temperature in the range of from 100° to 150° C.

The polymers formed by the practice of this invention may be depicted as having the structure $(A-B)_x$ wherein x is a positive integer wherein A is selected from the group:

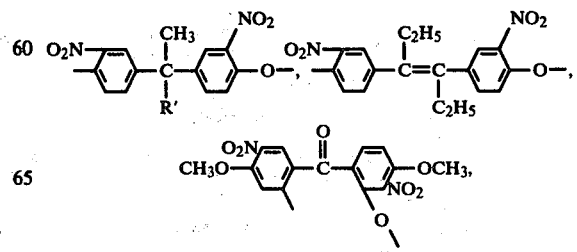

-continued

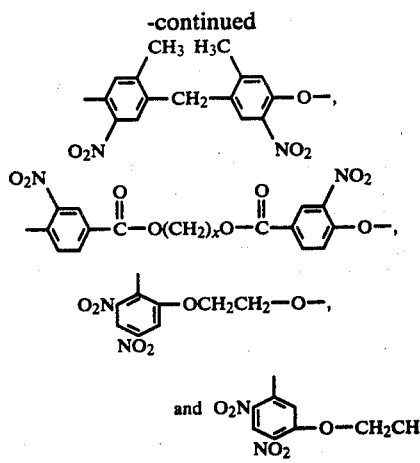

and wherein B is selected from the group:

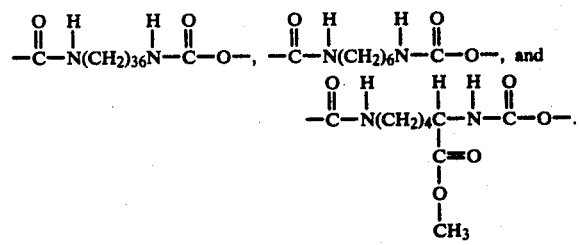

What is claimed is:

1. The polymers having the structure: $(A-B)_y$ wherein y is a positive integer, wherein the linkages between A and B are formed by the reaction of hydroxy groups and isocyanate groups, wherein A is selected from the group consisting of:

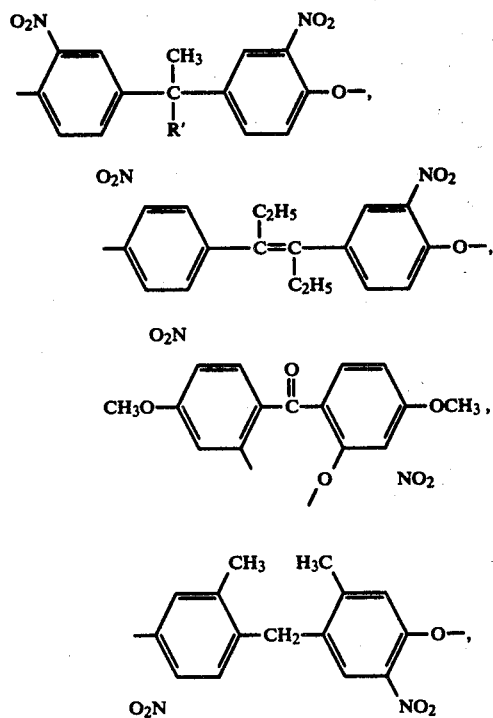

-continued

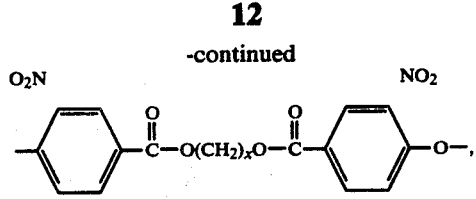

with R' being selected from the group consisting of $CH_3$, $C_2H_5$, $n-C_4H_9$, $n-C_5H_{11}$, $n-C_6H_{13}$, and $n-C_7H_{15}$, and x being a positive integer selected from 6 and 10 and wherein B is selected from the group consisting of:

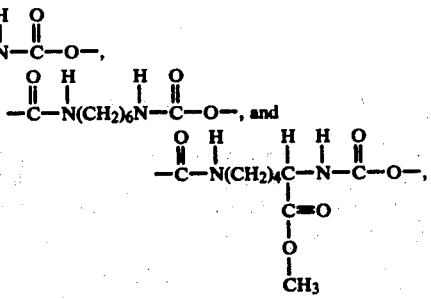

said polymers being reversibly dissociable.

2. The polymers according to claim 1 wherein A is

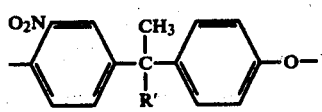

and wherein B is

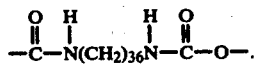

3. The polymers according to claim 1 wherein A is

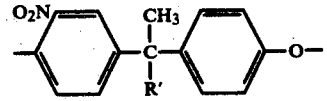

and wherein B is

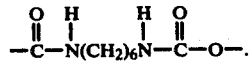

4. The polymers according to claim 1 wherein A is

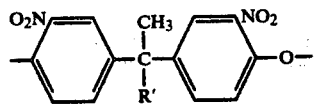
and wherein B is
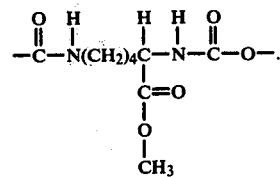
5. A polymer according to claim 2 wherein R' is $C_6H_{13}$.
6. A polymer according to claim 2 wherein R' is $C_7H_{15}$.
* * * * *